US00RE47876E

(19) United States
(12) Reissued Patent
Asai

(10) Patent Number: US RE47,876 E
(45) Date of Reissued Patent: Feb. 25, 2020

(54) MOBILE TERMINAL DEVICE, AND METHOD AND COMPUTER READABLE MEDIUM FOR THE SAME

(71) Applicant: Brother Kogyo Kabushiki Kaisha, Nagoya-shi, Aichi-ken (JP)

(72) Inventor: Norihiko Asai, Tajimi (JP)

(73) Assignee: Brother Kogyo Kabushiki Kaisha, Nagoya-shi, Aichi-ken (JP)

(21) Appl. No.: 15/624,272

(22) Filed: Jun. 15, 2017

Related U.S. Patent Documents

Reissue of:
(64) Patent No.: 9,058,146
Issued: Jun. 16, 2015
Appl. No.: 14/182,661
Filed: Feb. 18, 2014

(30) Foreign Application Priority Data

Mar. 7, 2013 (JP) ..... 2013-045316

(51) Int. Cl.
*G06F 3/12* (2006.01)
*H04W 4/00* (2018.01)
*H04W 4/80* (2018.01)

(52) U.S. Cl.
CPC ..... *G06F 3/1292* (2013.01); *G06F 3/1204* (2013.01); *G06F 3/1256* (2013.01); (Continued)

(58) Field of Classification Search
CPC .... G06F 3/1204; G06F 3/1236; G06F 3/1256; G06F 3/1268; G06F 3/1292; H04W 4/80
See application file for complete search history.

(56) References Cited

U.S. PATENT DOCUMENTS 7,252,633 B2 8/2007 Obata et al.
8,189,225 B1 5/2012 Lo et al. ..... G06F 3/122 358/1.15

(Continued)

FOREIGN PATENT DOCUMENTS

CN 1343063 A 4/2002
CN 101253469 A 8/2008

(Continued)

OTHER PUBLICATIONS

Extended EP Search Report dated Apr. 1, 2014, EP Appln. 13199178.8.

(Continued)

*Primary Examiner* — Joshua D Campbell
(74) *Attorney, Agent, or Firm* — Banner & Witcoff, Ltd.

(57) ABSTRACT

A mobile terminal device includes a processor configured to output a first print instruction to print one or more images corresponding to one or more pieces of image data contained in a specific image data set in one case of a first case that a near field wireless communication unit establishes near field wireless communication with a printer when a display unit is showing a display created based on a first display data and a second case that the near field wireless communication unit establishes the near field wireless communication with the printer when the display unit is showing a display created based on a second display data, and output a second print instruction to print one image corresponding to one piece of image data contained in the specific image data set in the other case.

18 Claims, 8 Drawing Sheets

Figure 1:
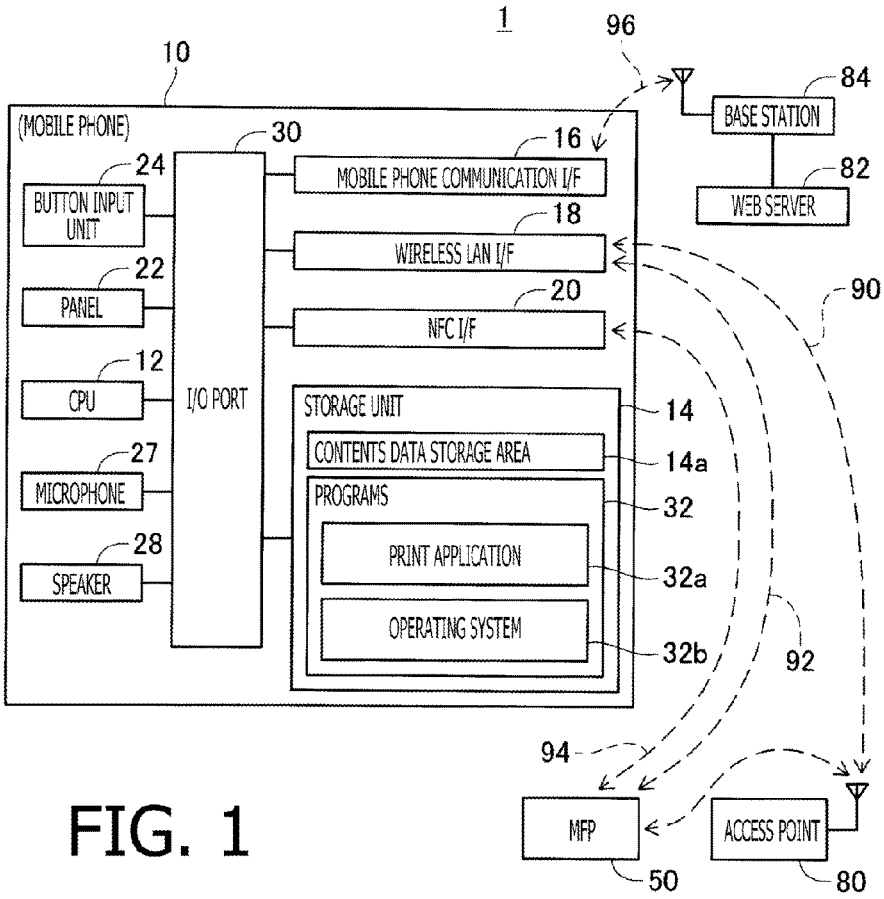

(52) U.S. Cl.
CPC ..... *G06F 3/1268* (2013.01); *H04W 4/80* (2018.02); *G06F 3/1236* (2013.01)

(56) References Cited

U.S. PATENT DOCUMENTS

| | | | | |
|---|---|---|---|---|
| 9,042,940 | B2 | 5/2015 | Suzuki et al. | |
| 9,094,780 | B2 | 7/2015 | Naruse | |
| 9,134,932 | B2 | 9/2015 | Shiraga | |
| 9,210,732 | B2 | 12/2015 | Suzuki | |
| 9,503,587 | B2 | 11/2016 | Naruse | |
| 2001/0034774 | A1 | 10/2001 | Watanabe et al. | |
| 2002/0105669 | A1 | 8/2002 | Watanabe et al. | |
| 2005/0270556 | A1 | 12/2005 | Shimamura | |
| 2007/0011679 | A1 | 1/2007 | Abe | |
| 2007/0013963 | A1 | 1/2007 | Nakamura | |
| 2007/0229857 | A1 | 10/2007 | Aiso | |
| 2009/0036056 | A1 | 2/2009 | Oshima et al. | |
| 2009/0091789 | A1 | 4/2009 | Hosotsubo | |
| 2009/0103124 | A1 | 4/2009 | Kimura et al. | |
| 2009/0207428 | A1 | 8/2009 | Tanimoto et al. | |
| 2010/0020355 | A1 | 1/2010 | Imai | |
| 2010/0046026 | A1 | 2/2010 | Heo | |
| 2010/0069008 | A1 | 3/2010 | Oshima et al. | H04W 4/02 455/41.3 |
| 2010/0097625 | A1 | 4/2010 | Kurihara | |
| 2010/0188695 | A1 | 7/2010 | Okigami | |
| 2010/0225962 | A1 | 9/2010 | Okigami et al. | |
| 2010/0231958 | A1 | 9/2010 | Okigami | |
| 2010/0321730 | A1 | 12/2010 | Tomi | |
| 2011/0026068 | A1 | 2/2011 | Yoshida | |
| 2011/0043857 | A1 | 2/2011 | Hiroki | |
| 2011/0063645 | A1 | 3/2011 | Sugino | |
| 2011/0292445 | A1 | 12/2011 | Kato | |
| 2012/0005378 | A1 | 1/2012 | Abe et al. | |
| 2012/0075664 | A1 | 3/2012 | Nichols et al. | |
| 2012/0154852 | A1 | 6/2012 | Hedberg | |
| 2012/0205432 | A1 | 8/2012 | Stone et al. | |
| 2012/0243041 | A1 | 9/2012 | Sakurai | |
| 2012/0246566 | A1 | 9/2012 | Shiraga | |
| 2012/0264372 | A1 | 10/2012 | Chen et al. | |
| 2013/0044341 | A1 | 2/2013 | Uchino | |
| 2013/0094047 | A1 | 4/2013 | Bailey et al. | |
| 2013/0141747 | A1* | 6/2013 | Oba et al. | 358/1.14 |
| 2013/0215446 | A1 | 8/2013 | Imai | |
| 2013/0229690 | A1* | 9/2013 | Sumita | H04N 1/00127 358/1.15 |
| 2013/0231051 | A1 | 9/2013 | Naruse | |
| 2013/0235422 | A1 | 9/2013 | Nakata | |
| 2013/0258401 | A1 | 10/2013 | Suzuki | |
| 2013/0267277 | A1 | 10/2013 | Okigami | |
| 2014/0185097 | A1 | 7/2014 | Shiraga | |
| 2014/0268231 | A1 | 9/2014 | Ito | |
| 2014/0293348 | A1 | 10/2014 | Kai | |
| 2015/0288832 | A1 | 10/2015 | Naruse | |

FOREIGN PATENT DOCUMENTS

| | | | |
|---|---|---|---|
| CN | 101827363 | A | 9/2010 |
| CN | 101834656 | A | 9/2010 |
| CN | 102736870 | A | 10/2012 |
| CN | 103309633 | A | 9/2013 |
| EP | 1199627 | A2 | 4/2002 |
| EP | 2026195 | A2 | 2/2009 |
| JP | 2004-328275 | A | 11/2004 |
| JP | 2006-163791 | A | 6/2006 |
| JP | 2007-166538 | A | 6/2007 |
| JP | 2007-261042 | A | 10/2007 |
| JP | 2009-037566 | A | 2/2009 |
| JP | 2009-251823 | A | 10/2009 |
| JP | 2010-041580 | A | 2/2010 |
| JP | 2010177947 | A | 8/2010 |
| JP | 2012-32845 | A | 2/2012 |
| JP | 2012-039518 | A | 2/2012 |
| JP | 2012-160207 | A | 8/2012 |
| JP | 2012-203745 | A | 10/2012 |
| JP | 2013-041519 | A | 2/2013 |
| JP | 2013-187568 | A | 9/2013 |
| JP | 2014-127130 | A | 7/2014 |
| WO | 2009/148145 | A1 | 12/2009 |
| WO | 2010107125 | A1 | 9/2010 |

OTHER PUBLICATIONS

Jul. 6, 2015—(US) Final Office Action—U.S. Appl. No. 14/228,317.
Jul. 17, 2015—(US) Non-Final Office Action—U.S. Appl. No. 14/142,046.
Jun. 12, 2015—(CN) Notification of First Office Action—App 201310741160.7, Eng Tran.
Sep. 10, 2015—(US)—Non-Final Office Action—U.S. Appl. No. 14/697,377.
Oct. 22, 2015—(US)—Non-Final Office Action—U.S. Appl. No. 14/228,317.
Sep. 29, 2015—(JP) Notification of Reasons for Rejection—App 2013-073552, Eng Tran.
Jan. 29, 2016—(US) Notice of Allowance—U.S. Appl. No. 14/142,046.
Jan. 12, 2016—(JP) Notification of Reasons for Rejection—App 2013-051929, Eng Tran.
Feb. 9, 2016—(US) Final Office Action—U.S. Appl. No. 14/697,377.
Mar. 1, 2016—(US) Notice of Allowance—U.S. Appl. No. 14/228,317.
Feb. 26, 2016—(CN) Notification of the Second Office Action—App 201310741160.7, Eng Tran.
Feb. 23, 2016—(JP) Notification of Reasons for Rejection—App 2012-285178, Eng Tran.
May 13, 2016—(US) Notice of Allowance—U.S. Appl. No. 14/228,317.
Jun. 6, 2016—(US) Notice of Allowance—U.S. Appl. No. 14/697,377.
May 26, 2016—(CN) Notification of First Office Action—App 201410123834-1, Eng Tran.
Jun. 8, 2016—(CN) Notification of First Office Action—App 201410083473.2, Eng Tran.
Jan. 27, 2017—(US) Non-Final Office Action—U.S. Appl. No. 15/280,742.
Jul. 19, 2016—(CN) Decision of Rejection—App 201310741160.7, Eng Tran.
Apr. 21, 2017—(CN) Notification of Reexamination—App 201310741160.7, Eng Tran.
May 16, 2017—(JP) Notification of Reasons for Rejection—App 2016-174320, Eng Tran.
Jun. 21,2018—(EP) Examination Report—App 13199178.8.
Apr. 26, 2018—(EP) Office Action—App 14152700.2.
Mar. 2, 2018—(US) Notice of Allowance—U.S. Appl. No. 15/790,108.
Jul. 6, 2017—(US) Notice of Allowance—U.S. Appl. No. 15/280,742.
Oct. 12, 2017—(US) Non-final Office Action—U.S. Appl. No. 15/394,312.
Jul. 17, 2018—(US) Notice of Allowance—U.S. Appl. No. 15/790,108.
May 9, 2019—U.S. Notice of Allowance—U.S. Appl. No. 15/394,312.
Apr. 22, 2019—(CN) Notification of First Office Action—App 201810597301.5, Eng Tran.
Jul. 8, 2019—U.S. Non-final Office Action—U.S. Appl. No. 15/715,875.
Jul. 23, 2019—(JP) Notification of Reasons for Rejection—App 2018-204888, Eng Tran.
Oct. 24, 2019—(EP) Extended Search Report—App 19186810.8.
Oct. 16, 2019—(EP) Extended Search Report—App 19177075.9.
Dec. 26, 2019—U.S. Final Office Action—U.S. Appl. No. 15/715,875.
Extended EP Search Report mailed Apr. 1, 2014, EP Appln. 13199178.8.
NFC Forum: "NFC Data Exchange Format (NDEF)--NDEF 1.0", Internet Citation, Jul. 24, 2006 (Jul. 24, 2006), XP002413994, Retrieved from the Internet: URL:http://www.nfc-forum.org/specs/spec_license/download_spec-/0f5678c114d295e2da0d902f4e7839846281fc44/NFCForum-TS-NDEF_1.0.pdf [retrieved on Jan. 10, 2007].
Oct. 8, 2014—(US) Non-Final Office Action—U.S. Appl. No. 14/206,571.
Sep. 15, 2014—(US) Non-Final Office Action—U.S. Appl. No. 14/142,046.
Jan. 7, 2015—(US) Notice of Allowance—U.S. Appl. No. 14/206,571.
Jan. 12, 2015—(US) Non-Final Office Action—U.S. Appl. No. 14/228,317.

(56) References Cited

OTHER PUBLICATIONS

Jan. 9, 2015—(EP) Extended EP Search Report—App 14152700.2.
Mar. 27, 2015—(US) Final Office Action—U.S. Appl. No. 14/142,046.

* cited by examiner

MOBILE TERMINAL DEVICE, AND METHOD AND COMPUTER READABLE MEDIUM FOR THE SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED [APPLICATION] *APPLICATIONS*

This application *is a Reissue of U.S. application Ser. No. 14/182,661, filed on Feb. 18, 2014, issued as U.S. Pat. 9,058,146 on Jun. 16, 2015, which* claims priority under 35 U.S.C. §119 from Japanese Patent Application No. 2013-045316 filed on Mar. 7, 2013. The entire subject matter of the application is incorporated herein by reference.

*In addition, U.S. application Ser. No. 15/715,875, filed Sep. 26, 2017, is a continuation reissue application of U.S. application Ser. No. 15/624,272* (*the present application*), *filed on Jun. 15, 2017. U.S. application Ser. No. 15/715,875, filed Sep. 26, 2017, is also a reissue application of U.S. Pat. No. 9,058,146 issued on Jun. 16, 2015* (*application Ser. No. 14/182,661, filed on Feb. 18, 2014*).

BACKGROUND

1. Technical Field

The following description relates to one or more techniques to cause a mobile terminal device to transmit, to a printer, a print instruction to print images.

2. Related Art

Recently, a plurality of wireless communication systems have been applied to communication between a mobile terminal device (such as a smartphone and a tablet computer) and a printer having a printing function. Examples of the wireless communication systems include Bluetooth® (trademark registered by BLUETOOTH SIG, INC.), Wi-Fi® (trademark registered by Wi-Fi Alliance), and Near Field Communication (hereinafter, which may be referred to as NFC). As a wireless communication technique using the wireless communication systems, for instance, a so-called handover communication technique has been proposed. In the handover communication technique, initially, wireless communication is established via the NFC between the mobile terminal device and the printer, and then, the communication method is switched via the NFC from the NFC to another communication system capable of higher-speed data communication than the NFC.

Specifically, when data communication is performed between a first communication device and a second communication device, initially, the first communication device acquires a communication system and an encryption system from the second communication device via the NFC. Then, when the acquired communication system and the acquired encryption system are coincident with a predetermined communication system and a predetermined encryption system for the first communication device, respectively, the first communication device is allowed to perform data communication with the second communication device via another communication system capable of higher-speed data communication than the NFC.

SUMMARY

However, the proposed handover communication technique has the following problem. When the proposed handover communication technique is applied to the data communication between a mobile terminal device and a printer, even after wireless communication is established therebetween using the handover communication technique, a further user operation (such as inputting a print instruction) is required for execution of a printing operation after establishment of the wireless communication. Therefore, in this case, the proposed handover communication technique is not so user-friendly.

Aspects of the present invention are advantageous to present one or more improved techniques to allow a mobile terminal device to perform data communication with a printer in a user-friendly manner.

According to aspects of the present invention, a mobile terminal device is provided, which includes a display unit, a near field wireless communication unit, and a processor configured to output first display data for controlling the display unit to display a first image in preference to a second image, the first image being for identifying a specific image data set containing one or more pieces of image data, the second image being for identifying one image corresponding to one piece of the one or more pieces of image data contained in the specific image data set, output second display data for controlling the display unit to display the second image in preference to the first image, output a first print instruction to print one or more images corresponding to the one or more pieces of image data contained in the specific image data set in one case of a first case that the near field wireless communication unit establishes near field wireless communication with a printer when the display unit is showing a display created based on the output first display data, and a second case that the near field wireless communication unit establishes the near field wireless communication with the printer when the display unit is showing a display created based on the output second display data, and output a second print instruction to print the one image corresponding to the one piece of image data contained in the specific image data in the other case of the first case and the second case.

According to aspects of the present invention, further provided is a method configured to be implemented on a processor connected with a display unit and a near field wireless communication unit, the method including outputting first display data for controlling the display unit to display a first image in preference to a second image, the first image being for identifying a specific image data set contain one or more pieces of image data, the second image being for identifying one image corresponding to one piece of the one or more pieces of image data contained in the specific image data set, outputting second display data for controlling the display unit to display the second image in preference to the first image, outputting a first print instruction to print one or more images corresponding to the one or more pieces of image data contained in the specific image data set, outputting a second print instruction to print one image corresponding to the one piece of image data contained in the specific image data set, and determining in which case, the near field wireless communication unit establishes near field wireless communication with a printer, of a first case that the display unit is showing a display created based on the output first display data, and a second case that the display unit is showing a display created based on the output second display data, the outputting of the first print instruction including outputting the first print instruction when it is determined that the near field wireless communication unit establishes the near field wireless communication with the printer in one case of the first case and the second case.

According to aspects of the present invention, further provided is a non-transitory computer readable medium storing computer readable instructions configured to, when executed by a processor connected with a display unit and a near field wireless communication unit, cause the processor to output first display data for controlling the display unit to display a first image in preference to a second image, the first image being for identifying a specific image data set containing one or more pieces of image data, the second image being for identifying one image corresponding to one piece of the one or more pieces of image data contained in the specific image data set, output second display data for controlling the display unit to display the second image in preference to the first image, output a first print instruction to print one or more images corresponding to the one or more pieces of image data contained in the specific image data set in one case of a first case that the near field wireless communication unit establishes near field wireless communication with a printer when the display unit is showing a display created based on the output first display data, and a second case that the near field wireless communication unit establishes the near field wireless communication with the printer when the display unit is showing a display created based on the output second display data, and output the second print instruction to print the one image corresponding to the one piece of image data contained in the specific image data in the other case of the first case and the second case.

BRIEF DESCRIPTION OF THE ACCOMPANYING DRAWINGS

FIG. 1 is a block diagram of a communication system in an embodiment according to one or more aspects of the present invention.

Figure 2:
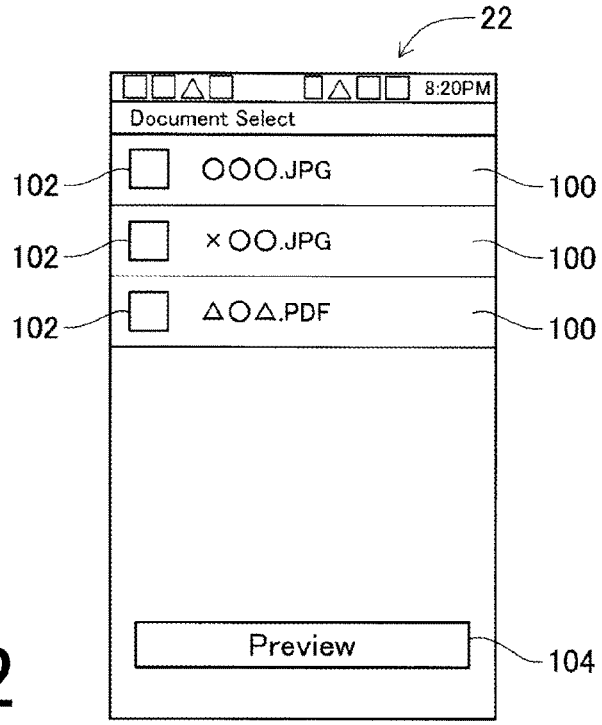
Figure 3:
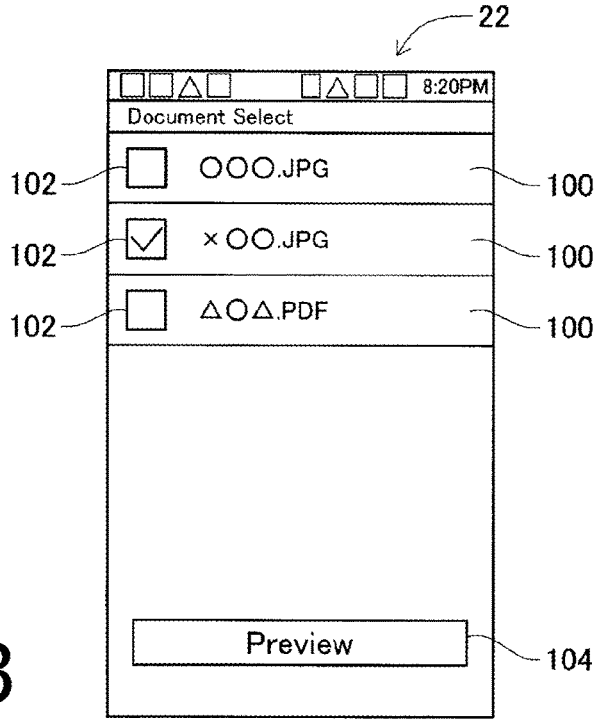

FIGS. 2 to 3 exemplify display modes of a contents data selecting screen displayed on a panel of a mobile phone in the embodiment according to one or more aspects of the present invention.

Figure 4:
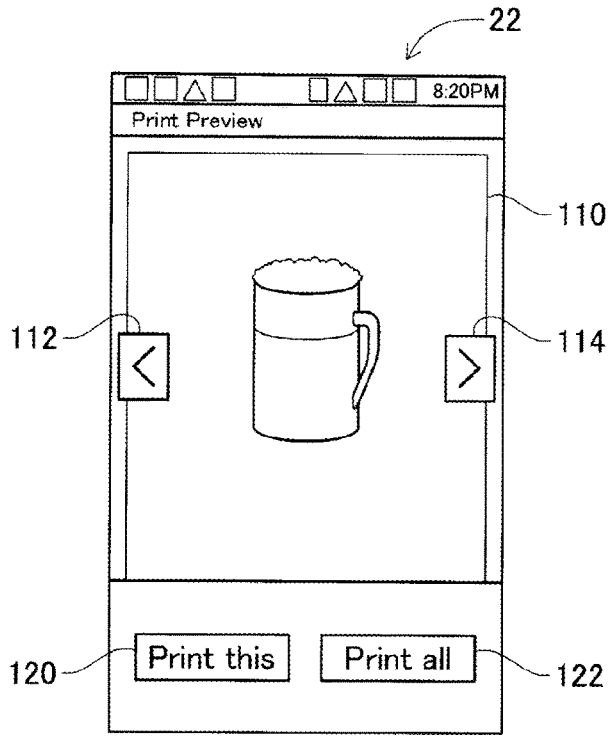
Figure 5:
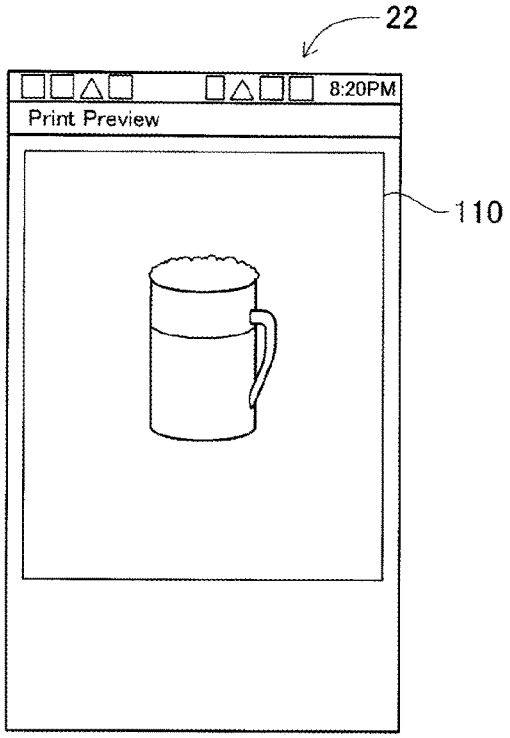
Figure 6:
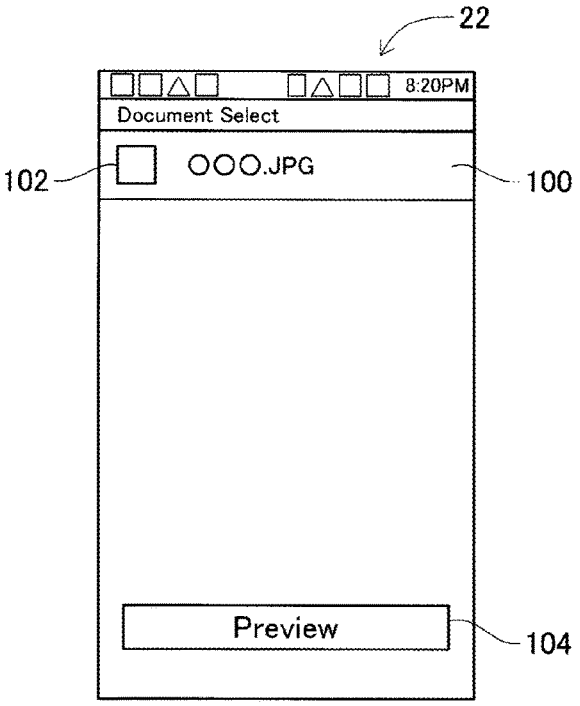

FIGS. 4 to 6 exemplify display modes of a preview screen displayed on the panel of the mobile phone in the embodiment according to one or more aspects of the present invention.

Figure 7:
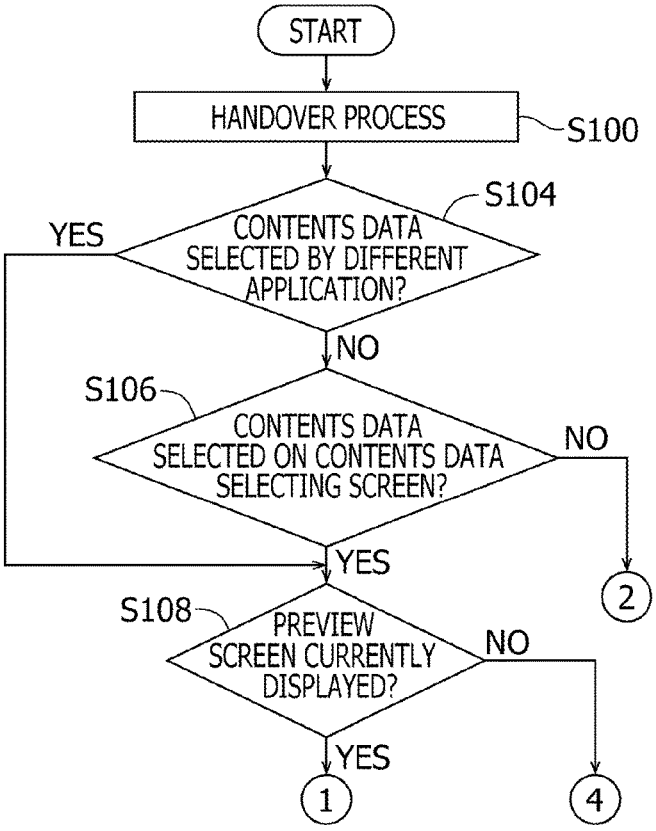
Figure 8:
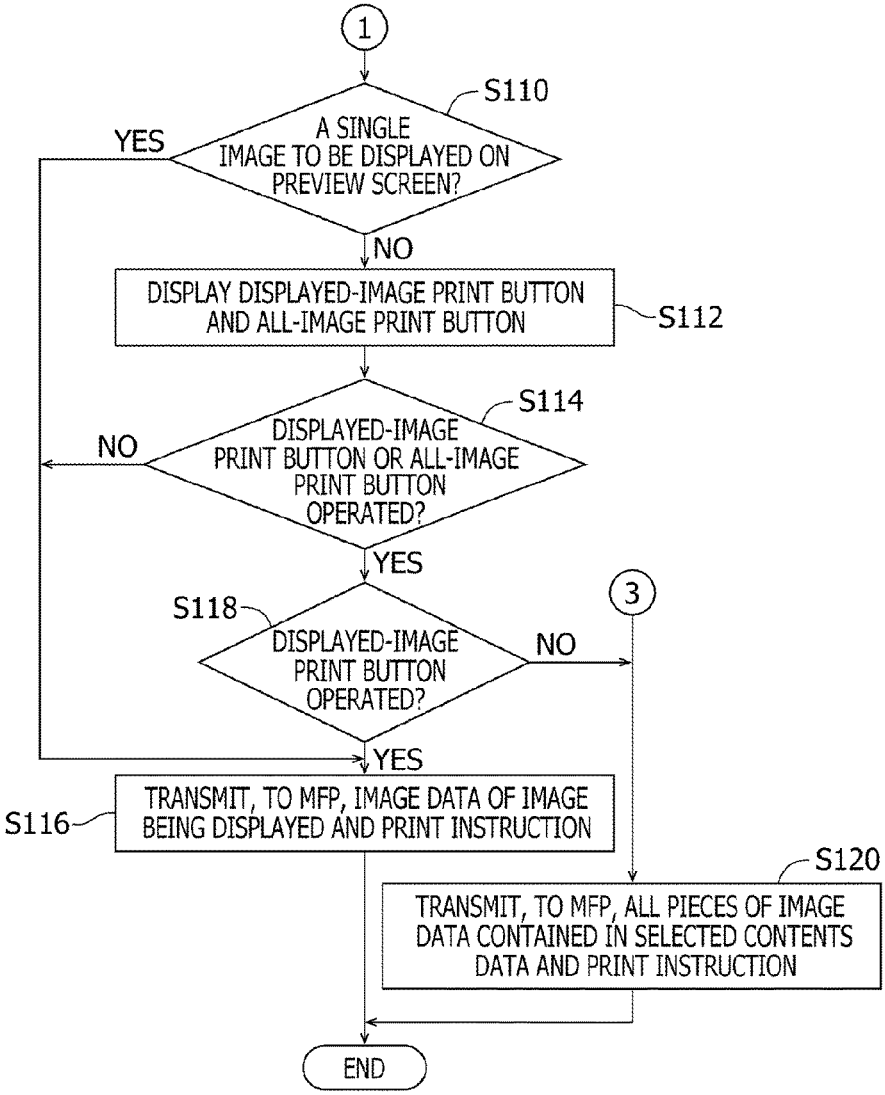
Figure 9:
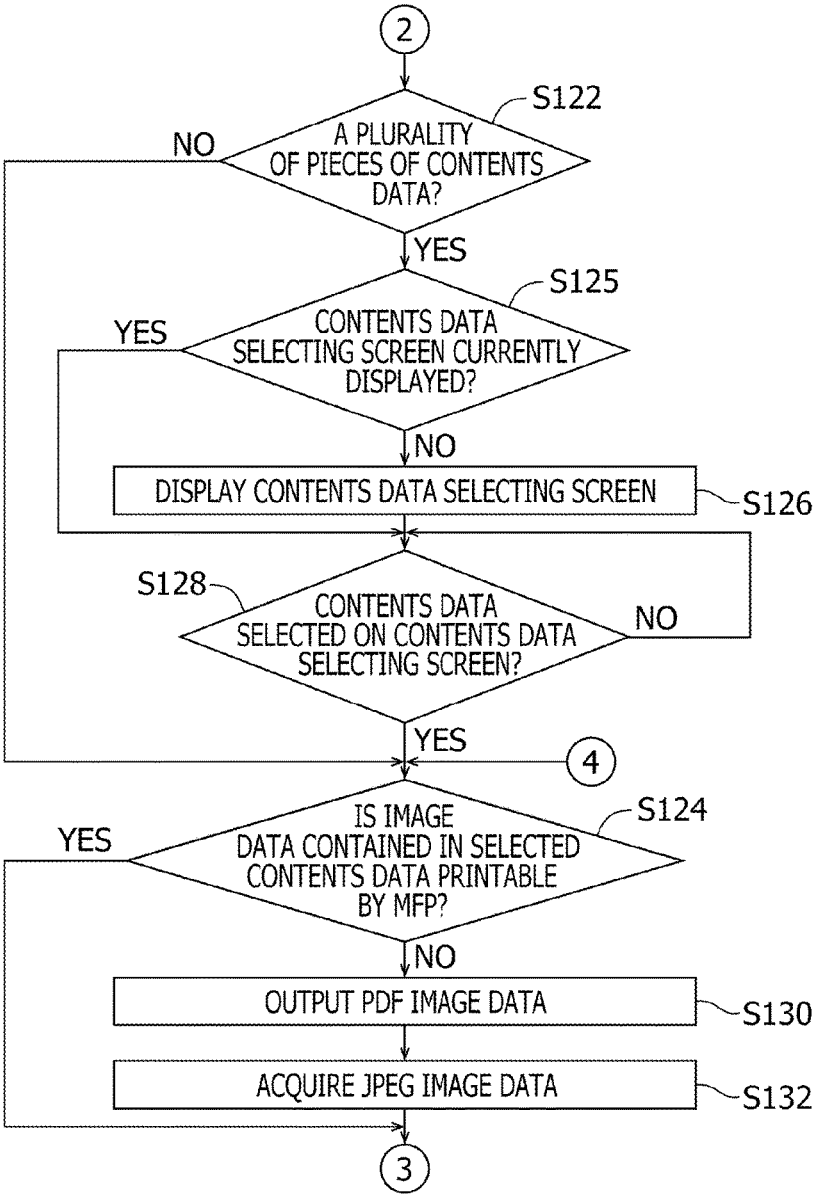

FIGS. 7 to 9 are flowcharts showing a procedure of a process to be executed by the mobile phone to cause a multi-function peripheral (hereinafter, which may be referred to as MFP) to print images based on contents data stored in the mobile phone in the embodiment according to one or more aspects of the present invention.

Figure 10:
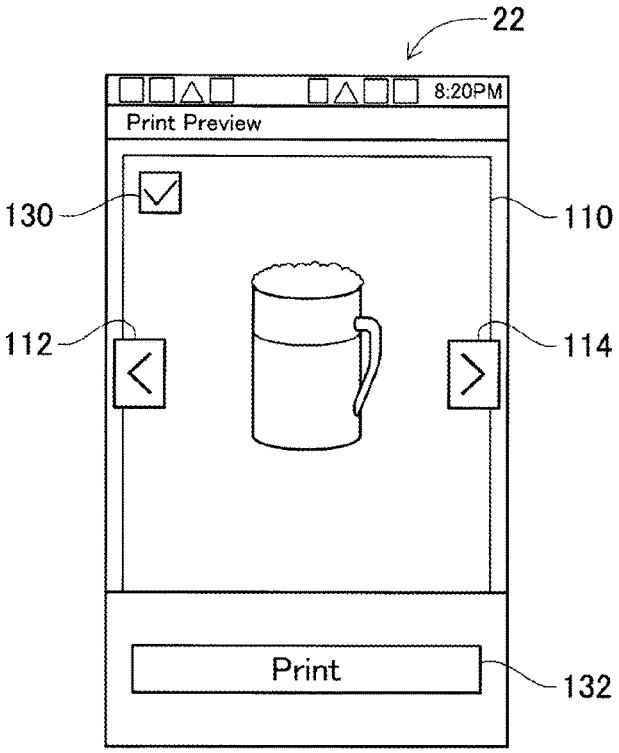

FIG. 10 exemplifies a display mode of a preview screen displayed on the panel of the mobile phone in a modification according to one or more aspects of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

<Configuration of Communication System>

As shown in FIG. 1, a communication system 1 of the embodiment includes a mobile phone 10, a multi-function peripheral (hereinafter, which may be referred to as MFP) 50, an access point 80, a web server 82, and a base station 84. Each of the mobile phone 10 and the MFP 50 is configured to serve as a wireless LAN terminal device. Further, the MFP 50 is configured to have a plurality of functions such as a printing function, a scanning function, a copy function, and a facsimile function. The access point 80 is configured to serve as a wireless LAN access point. The web server 82 is configured to provide a client device via a network with a function and data owned by the web server 82.

A configuration of the mobile phone 10 will be described. The mobile phone 10 includes a central processing unit (hereinafter, which may be referred to as CPU) 12, a storage unit 14, a mobile phone communication interface (hereinafter, which may be referred to as "I/F") 16, a wireless LAN interface (I/F) 18, an NFC interface (I/F) 20, a panel 22, a button input unit 24, a microphone 27, and a speaker 28. These elements 12, 14, 16, 18, 20, 22, 24, 27, and 28 are configured to communicate with each other via an input-output port 30.

The wireless LAN I/F 18 is configured to perform Wi-Fi (hereinafter, which may be referred to as WF) wireless communication 90 based on a communication standard IEEE 802.11 or an equivalent standard. Namely, the mobile phone 10 is configured to perform data communication with the MFP 50 via the access point 80 when accessing the access point 80 so as to be allowed to perform the WF wireless communication 90.

Further, the wireless LAN I/F 18 is configured to perform Wi-Fi Direct (hereinafter, which may be referred to as WFD) wireless communication 92 based on the communication standard IEEE 802.11 or an equivalent standard. Namely, the mobile phone 10 is configured to perform direct data communication with the MFP 50 when accessing an access point of the MFP 50 so as to be allowed to perform the WFD wireless communication 92.

The NFC I/F 20 is configured to perform NFC wireless communication 94 based on international standards of ISO/IEC21481 or ISO/IEC18092. Namely, the mobile phone 10 is configured to perform direct data communication with the MFP 50 when put into a state of the NFC wireless communication 94 being available. In this respect, nonetheless, the NFC wireless communication 94 has a shorter communicable distance and a lower communication speed than the WF wireless communication 90 and the WFD wireless communication 92.

The mobile phone communication I/F 16 is configured to perform mobile phone wireless communication 96 with the base station 84. Namely, the mobile phone 10 is configured to perform data communication with the web server 82 via the base station 84 when put into a state of the mobile phone wireless communication 96 being available. It is noted that, in this disclosure, the terms "information" and "data" are defined as follows. The term "information" is used as a higher-level broader concept than the term "data." Therefore, for instance, "A data" may be replaced with (translated into) "A information." Further, "B data" replicated or converted from "A data" may be replaced with (translated into) "A information" as far as "B data" is referred to with the same meaning as "A data."

The CPU 12 is configured to carry out processes in accordance with programs 32 stored in the storage unit 14. Hereinafter, the CPU 12 executing a program (such as a print application 32a) may be simply referred to as a program name of the program. For instance, "the print application 32a" may represent "the CPU 12 that executes the print application 32a." It is noted that the storage unit 14 may include a combination of a random access memory (hereinafter, which may be referred to as RAM), a read only memory (hereinafter, which may be referred to as ROM), a flash memory, a hard disk drive (hereinafter, which may be referred to as HDD), and a buffer of the CPU 12.

The storage unit 14 is configured to store the programs 32, which contain the print application 32a and an operating system (hereinafter, which may be referred to as OS) 32b. The print application 32a is configured to cause the CPU 12 to carry out a process for controlling the MFP 50 to print images expressed by contents data stored in a contents data storage area 14a. For instance, the OS 32b may be actualized by an Android OS.

The OS 32b is a program configured to provide a basic function to be used by the print application 32a. The OS 32b contains programs for performing the wireless communications 90, 92, 94, and 96 via the wireless LAN I/F 18, the NFC I/F 20, and the mobile phone communication I/F 16, and programs for controlling the storage unit 14, the panel 22, and the button input unit 24.

Further, the storage unit 14 includes the contents data storage area 14a, which is configured to store a plurality of pieces of contents data such as photograph data (e.g., JPEG data) and document data (e.g., PDF data). Each piece of contents data contains one more pieces of image data. In addition, the document data generally contains a plurality of pieces of page document data corresponding to a plurality of pages. The print application 32a is configured to acquire data from the storage unit 14 via the OS 32b.

The panel 22 includes a display screen configured to display various functions of the mobile phone 10. The print application 32a is configured to output image data and cause the panel 22 to display an image based on the image data via the OS 32b. The button input unit 24 includes a touch sensor, and is integrated with the panel 22. Thus, the button input unit 24 is configured to detect an input medium close to or in contact with the panel 22, and accept a user's button operation. The print application 32a is configured to acquire, via the OS 32b, data indicating what button operation has been performed by the user.

<Operations of Mobile Phone>

An explanation will be provided about operations of the mobile phone 10 in the embodiment. The mobile phone 10 is configured to cause the MFP 50 to print one or more images corresponding to the contents data stored in the contents data storage area 14a, in response to the mobile phone 10 being brought close to the MFP 50.

Specifically, the contents data storage area 14a of the mobile phone 10 stores, as contents data, a plurality of pieces of JPEG photograph data and a plurality of pieces of PDF document data. Further, as shown in FIG. 2, the panel 22 displays thereon a screen for selecting intended pieces of contents data from among the contents data stored in the contents data storage area 14a (hereinafter, the screen may be referred to as a "contents data selecting screen").

On the contents data selecting screen, data names 100 are displayed that represent the contents data stored in the contents data storage area 14a. In front of each data name 100, a confirmation box 102 is provided. The confirmation box 102 is configured to indicate whether contents data, corresponding to the data name 100 in front of which the confirmation box 102 is provided, is selected by the user. Specifically, the confirmation box 102 is configured such that a check mark "✓" is placed therein in response to a user's tapping operation applied onto the corresponding data name 100, as shown in FIG. 3. The contents data corresponding to the data name 100 with the check mark "✓" placed in the confirmation box 102 in front thereof is contents data selected by the user.

Further, by a user's tapping operation of the data name 100 with the check mark "✓" placed in the confirmation box 102 in front thereof, the check mark "✓" is removed from the confirmation box 102. Thereby, the user's selection of the contents data is canceled. Namely, the user is allowed to select and deselect an intended piece of the contents data stored in the contents data storage area 14a. It is noted that the tapping operation may be an operation for bringing an input medium (e.g., a user's finger) close to or into contact with the panel 22.

At a lower portion of the contents data selecting screen, a preview button 104 is displayed. In response to a tapping operation of the preview button 104, one or more images are displayed on the panel 22 based on one or more pieces of image data contained in the selected piece of contents data (which may be referred to as the selected contents data). Namely, the pane 122 displays thereon a preview screen for viewing the one or more images based on the one or more pieces of image data contained in the selected contents data.

As shown in FIG. 4, the preview screen is configured to display thereon images 110 based on one or more pieces of image data contained in the selected contents data, on an image-by-image basis. At both sides of the image 110 displayed, there are a back button 112 and a forward button 114 displayed on the preview screen. Each of the back button 112 and the forward button 114 is configured to, when a tapping operation is applied thereto, sequentially change the displayed image 110 to another, so as to have an intended image 110 displayed on the panel 22 (the preview screen).

By the aforementioned operations, the user is allowed to view the images 110 of the selected contents data. Then, in order to cause the MFP 50 to print the image 110 that the user is currently viewing, the user brings the mobile phone 10 close to the MFP 50. When the mobile phone 10 is brought close to the MFP 50 and put within a communicable distance from the MFP 50 for the NFC wireless communication 94, the NFC wireless communication 94 is established between the mobile phone 10 and the MFP 50.

When the NFC wireless communication 94 is established between the mobile phone 10 and the MFP 50, connection information for establishing the WF wireless communication 90 or WFD wireless communication 92 is transmitted between the mobile phone 10 and the MFP 50. This is because the WF wireless communication 90 and the WFD wireless communication 92 are allowed to achieve higher-speed data communication than the NFC wireless communication 94, and it is preferable that the document data or the photograph data is transmitted via the WF wireless communication 90 or the WFD wireless communication 92. It is noted that a process of switching via the NFC wireless communication 94 to the WF wireless communication 94 or the WFD wireless communication 92 capable of higher-speed data communication than the NFC wireless communication 94 is referred to as a handover process. Hereinafter, details about execution of the handover process will be described.

As an example of the connection information for establishing the WF wireless communication 90 or the WFD wireless communication 92, cited is a service set identifier (SSID) to be transmitted between the mobile phone 10 and the MFP 50. Specifically, when the NFC wireless communication 94 is established, initially, an SSID to be used by the wireless LAN I/F 18 of the mobile phone 10 is transmitted from the mobile phone 10 to the MFP 50 via the NFC wireless communication 94.

Then, when the SSID from the mobile phone 10 is identical to an SSID to be used by the MFP 50, the WF wireless communication 90 or the WFD wireless communication 92 is established between the mobile phone 10 and the MFP 50. In this case, a message, informing that the WF wireless communication 90 or the WFD wireless communication 92 is established, is transmitted from the MFP 50 to the mobile phone 10.

Meanwhile, when the SSID from the mobile phone 10 is not identical to the SSID to be used by the MFP 50, an SSID for accessing the access point of the MFP 50 and establishing the WFD wireless communication 92 is transmitted from the MFP 50 to the mobile phone 10 via the NFC wireless communication 94. Then, the mobile phone 10 establishes the WFD wireless communication 92 with the MFP 50 based on the SSID received from the MFP 50.

When the WFD wireless communication 92 or the WF wireless communication 90 is established between the mobile phone 10 and the MFP 50, the mobile phone 10 transmits the image data to the MFP 50 in accordance with user's operations. Specifically, as shown in FIG. 4, the preview screen displays thereon two types of print buttons 120 and 122 below the image 110. The print button 120 is for printing the image 110 being displayed on the panel 22 (hereinafter, the print button 120 may be referred to as a "displayed-image print button 120"). The print button 122 is for printing images based on all pieces of image data contained in the selected contents data (hereinafter, the print button 122 may be referred to as a "all-image print button 122").

When the displayed-image print button 120 is operated by the user, the image data of the image 110 being displayed on the panel 22 is transmitted from the mobile phone 10 to the MFP 50 via the WF wireless communication 90 or the WFD wireless communication 92. When the all-image print button 122 is operated by the user, all the pieces of image data contained in the selected contents data are transmitted from the mobile phone 10 to the MFP 50 via the WF wireless communication 90 or the WFD wireless communication 92. At this time, together with the image data, a print instruction to print the image(s) 110 is transmitted from the mobile phone 10 to the MFP 50. Thereby, the MFP 50 is caused to perform a printing operation of printing the image(s) 110 based on the image data received from the mobile phone 10.

When the image data to be printed is PDF image data, the PDF image data is converted into JPEG image data, since the MFP 50 is not allowed to perform a printing operation based on PDF image data. Specifically, the PDF image data is transmitted from the mobile phone 10 to the web server 82 via the mobile phone wireless communication 96, and is converted by the web server 82 into JPEG image data. Then, the converted JPEG image data is transmitted together with the print instruction from the web server 82 to the mobile phone 10 via the mobile phone wireless communication 96. Thereby, even though the image data to be printed is PDF image data, it is possible to cause the MFP 50 to perform a printing operation based on the image data.

In order to print the image 110 being displayed on the preview screen, as described above, it is required to operate the displayed-image print button 120 on the preview screen. In this respect, however, the mobile phone 10 is configured to cause the MFP 50 to perform a printing operation of printing the image 110 being displayed on the preview screen without the displayed-image print button 120 being operated.

Specifically, as shown in FIG. 4, in a situation where the image 110 is being displayed on the preview screen, when the mobile phone 10 is brought close to the MFP 50, the handover process is performed, in which the mobile phone 10 transmits a print instruction and the image data of the image 110 being displayed on the preview screen, to the MFP 50 via the WF wireless communication 90 or the WFD wireless communication 92. Namely, by bringing the mobile phone 10 with the image 110 being displayed on the panel 22 close to the MFP 50, it is possible to cause the MFP 50 to print the image 110. Thereby, it is possible to print the image 110 without having to operate the displayed-image print button 120, and to achieve the mobile phone 10 (the communication system 1) having user-friendliness improved.

Further, in order to print the images based on all the pieces of image data contained in the selected contents data, as described above, it is required to operate the all-image print button 122 on the preview screen. In this respect, however, the mobile phone 10 is configured to cause the MFP 50 to perform a printing operation of printing the images based on all the pieces of image data contained in the selected contents data.

Specifically, as shown in FIG. 3, in a situation where the selected contents data is selected on the contents data selecting screen, when the mobile phone 10 is brought close to the MFP 50, the handover process is performed, in which the mobile phone 10 transmits a print instruction and all the pieces of image data contained in the selected contents data to the MFP 50 via the WF wireless communication 90 or the WFD wireless communication 92. Namely, by bringing the mobile phone 10 with the data name 100 of the selected contents data being displayed on the panel 22 close to the MFP 50, it is possible to cause the MFP 50 to print the images based on all the pieces of image data contained in the selected contents data. Thereby, it is possible to print the images based on all the pieces of image data contained in the selected contents data without having to operate the all-image print button 122.

Further, when the selected contents data contains a single piece of image data (but does not contain any image data but the single piece of image data), a printing operation is carried out without the print button 120 or 122 being operated. Specifically, when contents data containing a single piece of image data is selected on the contents data selecting screen, and the preview button 104 is operated, a preview screen as shown in FIG. 5 is displayed on the panel 22. On the preview screen, there is a single image 110 displayed. Since there is not an image to be displayed other than the image 110 being displayed on the preview screen, the back button 112 or the forward button 114 is not displayed on the preview screen. In addition, the print button 120 or 122 is not displayed on the preview screen, as the handover process is carried out in which a print instruction and the image data of the single image 110 being displayed on the preview screen are automatically transmitted to the MFP 50.

Specifically, in a situation where the selected contents data contains a single piece of image data, and the image 110 based on the single piece of image data is displayed on the preview screen, when the mobile phone 10 is brought close to the MFP 50, the handover process is performed. In the handover process, the mobile phone 10 transmits the single piece of image data and the print instruction to the MFP 50 via the WF wireless communication 90 or the WFD wireless communication 92. Namely, when the selected contents data contains a single piece of image data, by bringing the mobile phone 10 with the image 110 based on the single piece of image data being displayed on the panel 22 close to the MFP 50, it is possible to cause the MFP 50 to print the image 110 based on the single piece of image data. Thereby, it is possible to print the image 110 based on the single piece of image data without having to operate the print button 120 or 122, and to achieve the mobile phone 10 (the communication system 1) having user-friendliness improved.

Further, when the contents data storage area 14a stores a single piece of contents data (but does not store any contents data but the single piece of contents data), it is possible to cause the MFP 50 to perform a printing operation based on the single piece of contents data without having to perform an operation of selecting the single piece of contents data (e.g., without having to apply a tapping operation onto the data name 100 on the contents data selecting screen). Namely, it is possible to perform the printing operation based on the single piece of contents data without an operation of selecting the single piece of contents data or an operation of the print button 120 or 122.

Specifically, when the contents data storage area 14a stores a single piece of contents data, as shown in FIG. 6, a single data name 100 of the single piece of contents data is displayed on the contents data selecting screen. On the contents data selecting screen shown in FIG. 6, there is not a check mark "√" placed in the confirmation box 102. Namely, an operation of selecting the single piece of contents data has not been applied onto the contents data selecting screen. Then, in a situation where the single data name 100 of the single piece of contents data is displayed on the contents data selecting screen, and an operation of selecting the single piece of contents data has not been applied onto the contents data selecting screen, when the mobile phone 10 is brought close to the MFP 50, the handover process is performed, in which the mobile phone 10 transmits a print instruction and all pieces of image data contained in the single piece of contents data to the MFP 50 via the WF wireless communication 90 or the WFD wireless communication 92. In other words, when there is a single piece of contents data, by bringing the mobile phone 10 with a single data name 100 of the single piece of contents data being displayed on the panel 22 close to the MFP 50, it is possible to print all images (based on all pieces of image data) contained in the single piece of contents data, without having to perform an operation of selecting the single piece of contents data or operate the all-image print button 122.

The aforementioned operations are performed in response to execution of the print application 32a. However, contents data may be selected in response to execution of another application. Even in such a case, the aforementioned operations may be performed. For instance, contents data selected by execution of a different application may be acquired by the print application 32a, using a shared function via the OS 32b. In this case, the aforementioned operations may be performed for the contents data selected by execution of the different application. At this time, since intended pieces of contents data have been selected by execution of the different application, a series of operations until the intended pieces of contents data are selected on the contents data selecting screen may not be required. Therefore, in response to execution of the print application 32a, subsequent operations to be performed after selection of contents data on the contents data selecting screen may be performed.

<Print Application>

The aforementioned printing operation is performed when the print application 32a is executed by the CPU 12. Hereinafter, referring to FIGS. 7 to 9, an explanation will be provided about a procedure to cause the MFP 50 to print images based on the contents data stored in the mobile phone 10.

When the mobile phone 10 is powered on, and the print application 32a is launched, a process according to a main flow is started. When the user operates a home screen of the mobile phone 10 and launches the print application 32a, the print application 32a immediately after the activation thereof is in a state where there is not any contents data selected. When the user launches the print application 32a after operating a different application and selecting contents data, the launched print application 32a acquires the contents data selected via the different application. In S100 of the main flow, the CPU 12 performs the aforementioned handover process, and then goes to S104. In S104, the CPU 12 determines whether there is contents data selected by execution of an application different from the print application 32a. Specifically, if the storage unit 14 stores a flag which the CPU 12 has caused the storage unit 14 to store when the print application 32a has acquired contents data selected by execution of a different application, using a shared function via the OS 32b, the CPU 12 determines that there is contents data selected by execution of an application different from the print application 32a (S104: Yes). In this case (S104: Yes), the CPU 12 goes to S108.

When determining that there is not contents data selected by execution of an application different from the print application 32a (S104: No), the CPU 12 goes to S106. In S106, the CPU 12 determines whether there is contents data selected on the contents data selecting screen. Namely, the CPU 12 determines whether the CPU 12 has acquired, via the OS 32b, data generated in response to a tapping operation applied to a data name 100. When determining that there is contents data selected on the contents data selecting screen (S106: Yes), the CPU 12 goes to S108.

In S108, the CPU 12 determines whether the preview screen is currently displayed on the panel 22. Specifically, when the CPU 12 outputs, via the OS 32b, screen data for displaying a predetermined screen, the OS 32b outputs data informing that the predetermined screen is displayed, in response to the predetermined screen being displayed. When acquiring the data from the OS 32b, the CPU 12 causes the storage unit 14 to store a flag indicating that the CPU 12 has acquired the data. Further, when the display of the predetermined screen is terminated, the OS 32b outputs data informing that the display of the predetermined screen is terminated. When acquiring the data, the CPU 12 invalidates the flag stored in the storage unit 14. As described in the section <Operations of Mobile Phone>, when a tapping operation is applied onto the preview button 104 displayed on the contents data selecting screen, the CPU 12 outputs, via the OS 32b, screen data for displaying the preview screen based on the image data contained in the selected contents data. In S108, when the storage unit 14 stores therein a flag indicating that the CPU 12 has acquired data output from the OS 32b in response to the preview screen being displayed, the CPU 12 determines that the preview screen is currently displayed on the panel 22 (S108: Yes). Then, the CPU 12 goes to S110. It is noted that, when (the CPU 12 that is executing) the print application 32a acquires contents data selected by execution of a different application, using a shared function via the OS 32b, the CPU 12 outputs, via the OS 32b, screen data for displaying the preview screen based on image data contained in the selected contents data. Therefore, when the CPU 12 determines that there is contents data selected by execution of an application different from the print application 32a (S104: Yes), the preview screen may be displayed on the panel 22. Further, it is noted that the case where the preview screen is not displayed on the panel 22 includes a case where the contents data selecting screen is displayed on the panel 22, and a case where the preview screen has not been displayed even after the CPU 12 has outputs, via the OS 32b, the screen data for displaying the preview screen.

In S110, the CPU 12 determines whether what is to be displayed on the preview screen is a single image, i.e., whether the selected contents data contains a single piece of image data (but does not contain any image data but the single piece of image data). When determining that what is to be displayed on the preview screen is a single image (S110: Yes), the CPU 12 goes to S120. Meanwhile, when determining that what is to be displayed on the preview screen is not a single image (S110: No), the CPU 12 goes to S112.

In S112, the CPU 12 displays the displayed-image print button 120 and the all-image print button 122 on the panel 22. Namely, the CPU 12 outputs, via the OS 32b, image data for displaying the displayed-image print button 120 and the all-image print button 122 on the panel 22. Then, the CPU 12 goes to S114.

In S114, the CPU 12 determines whether one of the displayed-image print button 120 and the all-image print button 122 has been operated before a lapse of a predetermined time period from a time of execution of S112. Namely, the CPU 12 determines whether the CPU 12 has acquired, via the OS 32b, data generated in response to a tapping operation applied onto one of the displayed-image print button 120 and the all-image print button 122. When determining that the predetermined time period has elapsed from the time of execution of S112 without the displayed-image print button 120 or the all-image print button 122 being operated (S114: No), the CPU 12 goes to S116.

In S116, the CPU 12 controls the wireless LAN I/F 18 to transmit image data of the image being displayed on the panel 22 and a print instruction to print the image based on the image data, to the MFP 50 via the WF wireless communication 90 or the WFD wireless communication 92. Then, the execution of the print application 32a is terminated. Thereby, the MFP 50 is caused to print the image being displayed on the panel 22 of the mobile phone 10.

Meanwhile, when determining that one of the displayed-image print button 120 and the all-image print button 122 has been operated before a lapse of the predetermined time period from the time of execution of S112 (S114: Yes), the CPU 12 goes to S118. In S118, the CPU 12 determines whether the displayed-image print button 120 has been operated. Namely, the CPU 12 determines whether the CPU 12 has acquired, via the OS 32b, data generated in response to a tapping operation applied onto the displayed-image print button 120. When determining that the displayed-image print button 120 has been operated (S118: Yes), the CPU 12 goes to S116.

Meanwhile, when determining that the displayed-image print button 120 has not been operated (S118: No), the CPU 12 goes to S120. In S120, the CPU 12 controls the wireless LAN I/F 18 to transmit all pieces of image data contained in the selected contents data and a print instruction to print images based on all the pieces of image data, to the MFP 50 via the WF wireless communication 90 or the WFD wireless communication 92. Then, the execution of the print application 32a is terminated. Thereby, the MFP 50 is caused to print the images based on all the pieces of image data contained in the selected contents data.

Further, in S106, when determining that there is not contents data selected on the contents data selecting screen (S106: No), the CPU 12 goes to S122. In S122, the CPU 12 determines whether the contents data stored in the storage unit 14 contains a plurality of pieces of contents data. When determining that the contents data stored in the storage unit 14 contains a single piece of contents data (S122: No), the CPU 12 goes to S124.

Meanwhile, when determining that the contents data stored in the storage unit 14 contains a plurality of pieces of contents data (S122: Yes), the CPU 12 goes to S125. In S125, the CPU 12 determines whether the contents data selecting screen is currently displayed on the panel 22, in a method equivalent to the method for the determination as to whether the preview screen is displayed on the panel 22. When determining that the contents data selecting screen is currently displayed on the panel 22 (S125: Yes), the CPU 12 goes to S128. Meanwhile, when determining that the contents data selecting screen is not currently displayed on the panel 22 (S125: No), the CPU 12 goes to S126. In S126, the CPU 12 controls the panel 22 to display thereon the contents data selecting screen. Namely, the CPU 12 outputs, via the OS 32b, image data for displaying the contents data selecting screen on the panel 22. Then, the CPU 12 goes to S128. It is noted that the case where the contents data selecting screen is not displayed on the panel 22 includes a case where the preview screen is displayed on the panel 22.

In S128, the CPU 12 determines whether there is contents data selected on the contents data selecting screen. Namely, the CPU 12 determines whether the CPU 12 has acquired, via the OS 32b, data generated in response to a tapping operation applied onto a data name 100. When determining that there is not contents data selected on the contents data selecting screen (S128: No), the CPU 12 goes back to S128 to repeatedly make the determination in S128.

When determining that there is contents data selected on the contents data selecting screen (S128: Yes), the CPU 12 goes to S124. In S124, the CPU 12 determines whether image data contained in the selected contents data is image data printable by the MFP 50. Namely, the CPU 12 determines whether image data contained in the selected contents data is JPEG image data. When determining that the image data contained in the selected contents data is image data printable by the MFP 50 (S124: Yes), the CPU 12 goes to S116, in which the CPU 12 performs the aforementioned operation in the step.

Meanwhile, when determining that the image data contained in the selected contents data is not image data printable by the MFP 50 (S124: No), the CPU 12 goes to S130. In S130, the CPU 12 outputs, via the OS 32b, PDF image data to be printed and an IP address of the mobile phone 10, so as to cause the mobile phone communication I/F 16 to transmit the PDF image data and the IP address to the web server 82. Then, the CPU 12 goes to S132. It is noted that, in the web server 82, the PDF image data received from the mobile phone 10 is converted into JPEG image data. Then, the converted JPEG image data is transmitted to the mobile phone 10.

In S132, the CPU 12 acquires, via the OS 32b, the JPEG image data converted by the web server 82. Then, the CPU 12 goes to S120, in which the CPU 12 performs the aforementioned operation in the step.

Further, in S108, when determining that the preview screen is not currently displayed on the panel 22 (S108: No), the CPU 12 goes to S124, in which the CPU 12 makes the aforementioned determination in the step.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiment will be omitted.

[Modifications]

In the aforementioned embodiment, when operating the mobile phone 10, the user is allowed to cause the MFP 50 to print a single image being displayed on the panel 22 of the mobile phone 10, or print images based on all pieces of image data contained in the selected contents data. Nonetheless, the mobile phone 10 may be configured to cause the MFP 50 to print a plurality of intended images. For example, as shown in FIG. 10, a confirmation box 130 may be displayed at an upper portion of the image 110 displayed on the panel 22. The confirmation box 130 may be configured to indicate whether the image 110 with the confirmation box 130 provided therefor is selected by the user. Specifically, the confirmation box 130 may be configured such that a check mark "√" is placed therein in response to a tapping operation applied onto the corresponding image 110. The image 110 with the check mark "√" placed in the confirmation box 130 is an image selected by the user. The user may be allowed to select a plurality of intended images. Then, when the user operates a print button 132 displayed below the image 110, the mobile phone 10 may transmit, to the MFP 50, image data corresponding to the selected images and a print instruction to print the images based on the image data. Thereby, it is possible to print a plurality of intended images.

Further, the mobile phone 10 may be configured to cause the MFP 50 to print a plurality of intended images without the print button 132 being operated. Specifically, when the mobile phone 10 on which a plurality of images 110 has been selected by user's operations is brought close to the MFP 50, the mobile phone 10 may transmit, to the MFP 50, image data corresponding to the selected images 110 and a print instruction to print the images 110 based on the image data. Thus, it is possible to print a plurality of intended images without having to operate the print button 132.

In the aforementioned embodiment, the mobile phone 10 is configured to control the panel 22 to display, on the contents data selecting screen, the data names 100 representing the contents data without displaying the images 110 based on the image data contained in the contents data. Further, the mobile phone 10 is configured to control the panel 22 to display, on the preview screen, the images 110 based on the image data contained in the selected contents data without displaying the data name 100 of the selected contents data. However, the respective display modes of the contents data selecting screen and the preview screen are not limited to the above modes. For instance, the contents data selecting screen may be configured to display thereon the data names 100 representing the contents data, and the images 110 based on the image data contained in the contents data. In this case, the contents data selecting screen may be configured to display the data names 100 in preference to the images 110 in various manners as well as the aforementioned manner of displaying the data names 100 without displaying the images 110. Specifically, for example, the contents data selecting screen may be configured to display the data names 100 in a more highlighted manner than the images 110. Further, the preview screen may be configured to display thereon the images 110 based on the image data contained in the selected contents data, and the data name 100 of the selected contents data. In this case, the preview screen may be configured to display the images 110 in a more highlighted manner than the data name 100. It is noted that a display mode to display one of the data name(s) 100 and the image(s) 110 in a more highlighted manner than the other on each of the contents data selecting screen and the preview screen may include a mode to display one of the data name(s) 100 and the image(s) 110 in a larger size than the other, and a mode to entirely display one of the data name(s) 100 and the image(s) 110 and partially display the other.

In the aforementioned embodiment, when displaying on the panel 22 images 110 based on image data, the CPU 12 outputs screen data containing path information for accessing the image data. However, the screen data may contain path information for accessing thumbnail data generated based on the image data, or may contain the image data. Furthermore, the screen data may contain path information for accessing image data converted by the web server 82 and/or thumbnail data generated by the web server 82.

Further, the image data transmitted from the mobile phone 10 to the MFP 50 may contain image data edited by the mobile phone 10 based on the image data previously stored in the mobile phone 10, image data edited by the web server 82 based on the image data previously stored in the mobile phone 10, or the image data previously stored in the mobile phone 10. Furthermore, the mobile phone 10 may transmit, to the MFP 50, information (such as a Uniform Resource Locator (URL)) for acquiring image data stored in the web server 82, and then the MFP 50 may acquire the image data from the web server 82. Moreover, the mobile phone 10 may transmit, together with the image data, print setting data to be used in a printing operation based on the image data.

Further, the contents data selecting screen may be configured to display thereon characters (such as letters, numbers, and symbols) for identifying the contents data, instead of the data names 100.

Further, the device configured to issue a print instruction when brought close to the MFP 50 is not limited to the mobile phone 10, but may include a tablet device or a smartphone.

The aforementioned embodiment provides an example where the CPU 12 of the mobile phone 10 is configured to execute various operations based on the print application 32a. However, the CPU 12 of the mobile phone 10 may be configured to issue, based on the print application 32a, instructions to cause other elements (such as the OS 32b, other systems, and hardware elements) to execute various operations.

In the aforementioned embodiment, when the selected contents data contains a single piece of image data, the mobile phone 10 is allowed to cause the MFP 50 to perform a printing operation based on the single piece of image data without the print button 120 or 122 being operated. In this regard, when the selected contents data contains a single piece of image data, the mobile phone 10 may be configured to display the displayed-image print button 120 on the panel 22, and to cause the MFP 50 to perform the printing operation based on the single piece of image data in response to the displayed-image print button 120 being operated. Further, even when the selected contents data contains a single piece of image data, the mobile phone 10 may cause the MFP 50 to perform the printing operation based on the single piece of image data in the same manner as when the selected contents data contains a plurality of pieces of image data. Specifically, the mobile phone 10 may cause the MFP 50 to perform the printing operation based on the single piece of image data without executing the operation in S110.

In the aforementioned embodiment, when executing the print application 32a, the mobile phone 10 (the CPU 12) performs the process according to the flow shown in FIGS. 7 to 9. However, the mobile phone 10 (the CPU 12) may not execute S104, S110, S112, S114, S118, and S122 to S132 in the flow. In this case, when the preview screen is currently displayed on the panel 22 (S108: Yes), the CPU 12 may go to S116. Further, when the preview screen is not currently displayed on the panel 22 (S108: No), the CPU 12 may go to S120. Moreover, the mobile phone 10 (the CPU 12) may execute a part of S104, S110, S112, S114, S118, and S122 to S132, instead of not executing any of the steps.

The mobile phone 10 may include a plurality of display units such as a display panel usable when a cover is open and a display panel usable when the cover is closed. The mobile phone 10 may include a plurality of operable input units such as a touch panel usable when the cover is open and a touch panel usable when the cover is closed. Alternatively, the mobile phone 10 may include a plurality of operable input units such as a touch panel and a keyboard.

Each program exemplified in the aforementioned embodiment may include only a single program module, or may include a plurality of program modules. Each individual configuration exemplified in the aforementioned embodiment may be replaced with a replaceable different configuration. Aspects of the present invention may be achieved by, as well as the CPU 12 executing the print application 32a, various configurations such as a computer executing a program (e.g., an operating system, an application, or a program) other than the print application 32a, a hardware element (e.g., the panel 22) operating in accordance with instructions from a computer, a configuration of a computer and a hardware element that operate in collaboration with each other, a computer executing a plurality of programs in collaboration with each other, and a hardware configuration that operates in accordance with instructions from a computer executing a plurality of programs in collaboration with each other.

What is claimed is:

1. A mobile terminal device comprising:

a display unit;

a near field wireless communication unit; and a processor configured to:

output first display data for controlling the display unit to display a data set identifying image in preference to a single-image identifying image, the data set identifying image being for identifying a specific image data set containing two or more pieces of image data, the single-image identifying image being for identifying one image corresponding to one piece of the two or more pieces of image data contained in the specific image data set;

output second display data for controlling the display unit to display the single-image identifying image in preference to the data set indentifying image;

output a first print instruction to print two or more images corresponding to the two or more pieces of image data contained in the specific image data set in a first case in which the near field wireless communication unit establishes near field wireless communication with a printer when the display unit is displaying the data set identifying image in preference to the single-image indentifying image, based on the output first display data; and output a second print instruction to print the one image corresponding to the one piece of image data contained in the specific image data set in a second case in which the near field wireless communication unit establishes the near field wireless communication with the printer when the display unit is displaying the single-image identifying image in preference to the data set indentifying image, based on the output second display data.

2. The mobile terminal device according to claim 1, further comprising an image-data-set selection acceptor configured to accept a selecting operation of selecting an image data set from among a plurality of image data sets stored in a storage unit, and wherein the processor is further configured to, in response to the image-data-set selection acceptor accepting the selecting operation, perform:

outputting the first display data in which the data set identifying image is for identifying the image data set selected by the selecting operation accepted by the image-data-set selection acceptor, and the single-image indentifying image is for identifying one image corresponding to one piece of image data contained in the selected image data set;

outputting the second display data in which the data set identifying image is for identifying the selected image data set, and the single-image identifying image is for identifying the one image corresponding to the one piece of image data contained in the selected image data set;

outputting the first print instruction to print two or more images corresponding to every piece of image data contained in the selected image data set; and outputting the second print instruction to print the one image corresponding to the one piece of image data contained in the selected image data set.

3. The mobile terminal device according to claim 2, wherein the processor is further configured to output, as the first print instruction, an instruction to print two or more images corresponding to every piece of image data contained in a single image data set stored in the storage unit, in response to the near field wireless communication unit establishing the near field wireless communication with the printer at a time different from a first time when the display unit is showing the display created based on the first display data and a second time when the display unit is showing the display created based on the second display data, when the storage unit does not store any image data set but the single image data set.

4. The mobile terminal device according to claim 2, wherein the processor is further configured to output, as the first print instruction, an instruction to print two or more images corresponding to every piece of image data contained in the selected image data set stored in the storage unit, in response to the near field wireless communication unit establishing the near field wireless communication with the printer at a time different from a first time when the display unit is showing the display created based on the first display data and a second time when the display unit is showing the display created based on the second display data, after the image-data-set selection acceptor accepts the selecting operation.

5. The mobile terminal device according to claim 4, wherein the image-data-set selection acceptor is further configured to accept the selecting operation of selecting an image data set from among the plurality of image data sets stored in a storage unit, in response to the near field wireless communication unit establishing the near field wireless communication with the printer at a time different from the first time and the second time, when the image-data-set selection acceptor has not accepted the selecting operation, and wherein the processor is further configured to output, as the first print instruction, the instruction to print the two or more images corresponding to every piece of image data contained in the selected image data set stored in the storage unit, after the image-data-set selection acceptor accepts the selecting operation.

6. The mobile terminal device according to claim 2, further comprising a memory configured to store first instructions and second instructions executable by the processor, the second instructions being different from the first instructions, wherein the processor is further configured to, when executing the first instructions stored in the memory, perform the outputting of the first display data, the outputting of the second display data, the outputting of the first print instruction, and the outputting of the second print instruction, and wherein the processor is further configured to, when an image data set is selected, by execution of the second instructions stored in the memory, from among the plurality of image data sets stored in the storage unit, perform:

outputting, as the first print instruction, an instruction to print two or more images corresponding to every piece of image data contained in the image data set selected by execution of the second instructions; and outputting, as the second print instruction, an instruction to print one image corresponding to one piece of image data contained in the image data set selected by execution of the second instructions.

7. The mobile terminal device according to claim 1, further comprising an image-data selection acceptor configured to accept a data selecting operation of selecting one piece of image data from among the two or more pieces of image data contained in the specific image data set, wherein the processor is further configured to output, as the second print instruction, an instruction to print one image corresponding to the one piece of image data selected by the data selecting operation accepted by the image-data selection acceptor, in response to the image-data selection acceptor accepting the data selecting operation.

8. The mobile terminal device according to claim 1, wherein the two or more pieces of image data contained in the specific image data set comprise a plurality of pieces of document data separated on a page-by-page basis.

9. The mobile terminal device according to claim 1, wherein the processor is further configured to:

output, as the first display data, data for controlling the display unit to display the data set indentifying image without displaying the single-image identifying image; and output, as the second display data, data for controlling the display unit to display the single-image indentifying image without displaying the data set identifying image.

10. The mobile terminal device according to claim 1, wherein the processor is further configured to:

output, as the first display data, data for controlling the display unit to display the data set indentifying image in a more highlighted manner than the single-image identifying image; and output, as the second display data, data for controlling the display unit to display the single-image identifying image in a more highlighted manner than the data set identifying data set image.

11. A method configured to be implemented on a processor connected with a display unit and a near field wireless communication unit, the method comprising:

outputting first display data for controlling the display unit to display a data set identifying image in preference to a single-image identifying image, the data set identifying image being for identifying a specific image data set containing two or more pieces of image data, the single-image identifying image being for identifying one image corresponding to one piece of the two or more pieces of image data contained in the specific image data set;

outputting second display data for controlling the display unit to display the single-image identifying image in preference to the data set identifying image;

determining in which case, the near field wireless communication unit establishes near field wireless communication with a printer, of:

a first case in which the display unit is showing a display created based on the output first display data; and a second case in which the display unit is showing a display created based on the output second display data;

outputting a first print instruction to print two or more images corresponding to the two or more pieces of image data contained in the specific image data set when it is determined that the near field wireless communication unit establishes the near field wireless communication with the printer in the first case; and outputting a second print instruction to print one image corresponding to the one piece of image data contained in the specific image data set when it is determined that the near field wireless communication unit establishes the near field wireless communication with the printer in the second case.

12. A non-transitory computer readable medium storing computer readable instructions configured to, when executed by a processor connected with a display unit and a near field wireless communication unit, cause the processor to:

output first display data for controlling the display unit to display a data set identifying image in preference to a single-image identifying image, the data set identifying image being for identifying a specific image data set containing two or more pieces of image data, the single-image identifying image being for identifying one image corresponding to one piece of the two or more pieces of image data contained in the specific image data set;

output second display data for controlling the display unit to display the single-image identifying image in preference to the data set indentifying image;

output a first print instruction to print two or more images corresponding to the two or more pieces of image data contained in the specific image data set in a first case in which the near field wireless communication unit establishes near field wireless communication with a printer when the display unit is displaying the data set identifying image in preference to the single-image identifying image, based on the output first display data; and output a second print instruction to print the one image corresponding to the one piece of image data contained in the specific image data set in a second case in which the near field wireless communication unit establishes the near field wireless communication with the printer when the display unit is displaying the single-image identifying image in preference to the data set identifying image, based on the output second display data.

13. The non-transitory computer readable medium according to claim 12, wherein the processor is connected to an image-data-set selection acceptor configured to accept a selecting operation of selecting an image data set from among a plurality of image data sets stored in a storage unit, wherein the computer readable instructions are further configured to, when executed by the processor, cause the processor to, in response to the image-data-set selection acceptor accepting the selecting operation, perform:

outputting the first display data in which the data set identifying image is for identifying the image data set selected by the selecting operation accepted by the image-data-set selection acceptor, and the single-image identifying image is for identifying one image corresponding to one piece of image data contained in the selected image data set; and outputting the second display data in which the data set identifying image is for identifying the selected image data set, and the single-image identifying image is for identifying the one image corresponding to the one piece of image data contained in the selected image data set;

outputting the first print instruction to print two or more images corresponding to every piece of image data contained in the selected image data set; and outputting the second print instruction to print the one image corresponding to the one piece of image data contained in the selected image data set.

14. The non-transitory computer readable medium according to claim 13, wherein the computer readable instructions are further configured to, when executed by the processor, cause the processor to output, as the first print instruction, an instruction to print two or more images corresponding to every piece of image data contained in a single image data set stored in the storage unit, in response to the near field wireless communication unit establishing the near field wireless communication with the printer at a time different from a first time when the display unit is showing the display created based on the first display data and a second time when the display unit is showing the display created based on the second display data, when the storage unit does not store any image data set but the single image data set.

15. The non-transitory computer readable medium according to claim 13, wherein the computer readable instructions are further configured to, when executed by the processor, cause the processor to output, as the first print instruction, an instruction to print two or more images corresponding to every piece of image data contained in the selected image data set stored in the storage unit, in response to the near field wireless communication unit establishing the near field wireless communication with the printer at a time different from a first time when the display unit is showing the display created based on the first display data and a second time when the display unit is showing the display created based on the second display data, after the image-data-set selection acceptor accepts the selecting operation.

16. The non-transitory computer readable medium according to claim 15, wherein the image-data-set selection acceptor is further configured to accept the selecting operation of selecting an image data set from among the plurality of image data sets stored in a storage unit, in response to the near field wireless communication unit establishing the near field wireless communication with the printer at a time different from the first time and the second time, when the image-data-set selection acceptor has not accepted the selecting operation, and wherein the computer readable instructions are further configured to, when executed by the processor, cause the processor to output, as the first print instruction, the instruction to print the two or more images corresponding to every piece of image data contained in the selected image data set stored in the storage unit, after the image-data-set selection acceptor accepts the selecting operation.

17. The non-transitory computer readable medium according to claim 12, wherein the processor is connected to an image-data selection acceptor configured to accept a data selecting operation of selecting one piece of image data from among the two or more pieces of image data contained in the specific image data set, and wherein the computer readable instructions are further configured to, when executed by the processor, cause the processor to output, as the second print instruction, an instruction to print one image corresponding to the one piece of image data selected by the data selecting operation accepted by the image-data selection acceptor, in response to the image-data selection acceptor accepting the data selecting operation.

*18. The mobile terminal device according to claim 1, wherein the processor is further configured to:*

*specify a plurality of images to be printed from among the two or more images corresponding to the two or more pieces of image data contained in the specific image data set, via the single-image identifying image; and*

*output a third print instruction to print the plurality of images specified from among the two or more images corresponding to the two or more pieces of image data contained in the specific image data set, in a third case in which the near field wireless communication unit establishes the near field wireless communication with the printer in a state where the plurality of images have been specified via the single-image identifying image.*

* * * * *